(12) United States Patent
Ohori et al.

(10) Patent No.: US 12,395,052 B2
(45) Date of Patent: Aug. 19, 2025

(54) WINDING DEVICE AND MOTOR

(71) Applicant: MITSUBA Corporation, Gunma (JP)

(72) Inventors: Ryo Ohori, Gunma (JP); Naoki Shioda, Gunma (JP); Masaki Hayata, Gunma (JP)

(73) Assignee: MITSUBA Corporation, Gunma (JP)

( * ) Notice: Subject to any disclaimer, the term of this patent is extended or adjusted under 35 U.S.C. 154(b) by 229 days.

(21) Appl. No.: 17/909,762

(22) PCT Filed: Feb. 25, 2021

(86) PCT No.: PCT/JP2021/007043
§ 371 (c)(1),
(2) Date: Sep. 7, 2022

(87) PCT Pub. No.: WO2021/192798
PCT Pub. Date: Sep. 30, 2021

(65) Prior Publication Data
US 2023/0104723 A1  Apr. 6, 2023

(30) Foreign Application Priority Data
Mar. 24, 2020 (JP) ................. 2020-052779

(51) Int. Cl.
*H02K 15/095* (2006.01)
*B21F 3/00* (2006.01)
(Continued)

(52) U.S. Cl.
CPC ............. *H02K 15/095* (2013.01); *B21F 3/00* (2013.01); *H02K 1/146* (2013.01); *H02K 1/278* (2013.01);
(Continued)

(58) Field of Classification Search
CPC ........... H02K 1/14; H02K 1/146; H02K 1/16; H02K 1/165; H02K 1/278; H02K 1/2781; H02K 2213/03
See application file for complete search history.

(56) References Cited

U.S. PATENT DOCUMENTS 6,707,209 B2 * 3/2004 Crapo .................. H02K 1/2781
310/156.01
2017/0047821 A1 * 2/2017 Klassen .................... H02K 5/16

FOREIGN PATENT DOCUMENTS

CN 102201721 9/2011
CN 205081606 3/2016
(Continued)

OTHER PUBLICATIONS

Machine Translation of JP_3489215_B2 (Year: 2004).*
(Continued)

*Primary Examiner* — Alexander A Singh
*Assistant Examiner* — Charlie Frank Mann, Jr.
(74) *Attorney, Agent, or Firm* — JCIPRNET (57) ABSTRACT

Provided are a winding device and a motor. A nozzle that feeds out a coil has: a nozzle hole from which the coil is fed out; an inner-diameter round chamfered part formed on an opening edge of a tip of the nozzle; an outer-diameter round chamfered part formed on the outer peripheral edge of the tip of the nozzle. When the wire diameter of the coil is defined as $\Phi c$, the inner diameter of the nozzle hole is defined as $\Phi in$, the radius of curvature of the inner-diameter round chamfered part is defined as Rin, and the radius of curvature of the outer-diameter round chamfered part is defined as Rout, they satisfy $1.2\Phi c \leq \Phi in \leq 1.4\Phi c$, $0.5\Phi c \leq Rin \leq \Phi c$, and $0.25\Phi c \leq Rout \leq 0.5\Phi c$.

8 Claims, 5 Drawing Sheets

(51) Int. Cl.
*H02K 1/14* (2006.01)
*H02K 1/278* (2022.01)
*H02K 3/18* (2006.01)
*H02K 7/116* (2006.01)
*H02K 21/16* (2006.01)

(52) U.S. Cl.
CPC ............. *H02K 3/18* (2013.01); *H02K 7/1166* (2013.01); *H02K 21/16* (2013.01); *H02K 2213/03* (2013.01)

(56) References Cited

FOREIGN PATENT DOCUMENTS

| JP | 3489215 B2 * | 1/2004 |
|---|---|---|
| JP | 2007325490 | 12/2007 |
| JP | 2011223858 | 11/2011 |
| WO | 2014124828 | 8/2014 |

OTHER PUBLICATIONS

Web Article by Tom Niswander, https://infinity-cable-products.com/blogs/terms/what-is-awg-american-wire-gauge (Year: 2019).*

"International Search Report (Form PCT/ISA/210) of PCT/JP2021/007043," mailed on May 11, 2021, with English translation thereof, pp. 1-4.

"Written Opinion of the International Searching Authority (Form PCT/ISA/237) of PCT/JP2021/007043," mailed on May 11, 2021, with English translation thereof, pp. 1-6.

"The First Office Action of China Counterpart Application", issued on May 20, 2025, with English translation thereof, pp. 1-15.

* cited by examiner

WINDING DEVICE AND MOTOR

CROSS-REFERENCE TO RELATED APPLICATION

This application is a 371 application of the International PCT application serial no. PCT/JP2021/007043, filed on Feb. 25, 2021, which claims the priority benefits of Japan Patent Application No. 2020-052779, filed on Mar. 24, 2020. The entirety of each of the above-mentioned patent applications is hereby incorporated by reference herein and made a part of this specification.

TECHNICAL FIELD

The disclosure relates to a winding device and a motor.

RELATED ART

Some motors include a stator having multiple teeth around which a coil is wound, and a rotor rotatably provided with respect to the stator. The winding device that winds the coil around the teeth includes a flyer having a nozzle for feeding the coil and a base for supporting the stator. Then, when winding the coil around the teeth, the base is rotated or moved up and down, and the flyer is moved. As a result, the relative position between the stator and the flyer changes. That is, a nozzle is inserted from a slot between adjacent teeth, and the nozzle moves around the teeth while feeding out a coil. As a result, the coil is wound around the teeth.

CITATION LIST

Patent Literature

[Patent Literature 1] Japanese Patent Application Laid-Open No. 2007-325490

SUMMARY

Technical Problem

By the way, when winding the coil around the teeth, the coil drawn out from the nozzle is greatly bent with the end of the nozzle as a fulcrum. At this time, if the pulling force of the coil is large, an unreasonable bending stress is applied to the coil, which may damage the coil.

In order to suppress the bending stress, it is conceivable to increase the size of the nozzle to reduce the bending stress applied to the coil. However, if the nozzle is simply enlarged in this way, the motor may be enlarged or the motor characteristics may be deteriorated, and, for example, it is necessary to increase the slot width between the teeth.

Therefore, the disclosure provides a winding device and a motor which can prevent damage on a coil during winding work and prevent an increase in size and a decrease in motor property.

Solution to Problem

In view of the above problems, a winding device according to the disclosure is a winding device for winding a coil around a tooth. The winding device includes a nozzle that feeds out the coil. The nozzle includes: a nozzle hole through which the coil is fed out; an inner-diameter round chamfered part formed on an opening edge of the nozzle hole on a side where the coil is fed out; and an outer-diameter round chamfered part formed on an outer peripheral edge at an end on the side where the coil is fed out. When a wire diameter of the coil is defined as $\Phi c$, an inner diameter of the nozzle hole is defined as $\Phi in$, a radius of curvature of the inner-diameter round chamfered part is defined as Rin, and a radius of curvature of the outer-diameter round chamfered part is defined as Rout, each of $\Phi c$, $\Phi in$, Rin, and Rout satisfies:

$1.2\Phi c \leq \Phi in \leq 1.4\Phi c$, $0.5\Phi c \leq Rin \leq \Phi c$, and $0.25\Phi c \leq Rout \leq 0.5\Phi c$.

A motor according to the disclosure is a motor in which a coil is wound by the winding device as described above. The motor includes: a stator having a core part in a tubular shape, and the tooth that protrudes inward in a radial direction from an inner peripheral surface of the core part and around which the coil is wound; and a rotor provided inside the stator in the radial direction and rotating around a rotation axis. The rotor includes: a shaft that rotates around the rotation axis; a rotor core that is supported by the shaft and rotates with the rotation axis as a radial center; a magnet disposed on an outer peripheral surface of the rotor core; and a protrusion that protrudes outward in the radial direction between the magnets adjacent to each other in a circumferential direction of the outer peripheral surface of the rotor core.

In the above configuration, the core part may be formed in a polygonal shape when viewed from a direction of the rotation axis, and the inner peripheral surface of the core part may be formed flat so that a wall thickness of one side of the core part is uniform.

In the above configuration, the wire diameter $\Phi c$ may satisfy $0.3 \text{ mm} \leq \Phi c \leq 1.5 \text{ mm}$.

In the above configuration, the tooth may include: a tooth body that protrudes inward in the radial direction from the inner peripheral surface of the core part; and a collar that extends along a circumferential direction from a radial inner end of the tooth body. When a width in the circumferential direction at a tooth opening between the collars adjacent to each other in the circumferential direction is defined as Wt, the width Wt and the wire diameter $\Phi c$ may satisfy $3.83 \leq Wt/\Phi c \leq 6.73$.

Effects of Invention

According to the disclosure, since the bending stress of the coil fed out from the nozzle may be reduced, damage to the coil during the winding work may be prevented. Further, since it is not necessary to unnecessarily increase the size of the nozzle, it is possible to prevent the motor from becoming large and the motor characteristics from deteriorating.

DESCRIPTION OF THE EMBODIMENTS

Next, an embodiment of the disclosure will be described with reference to the drawings.

<Brushless Motor>

Figure 1:
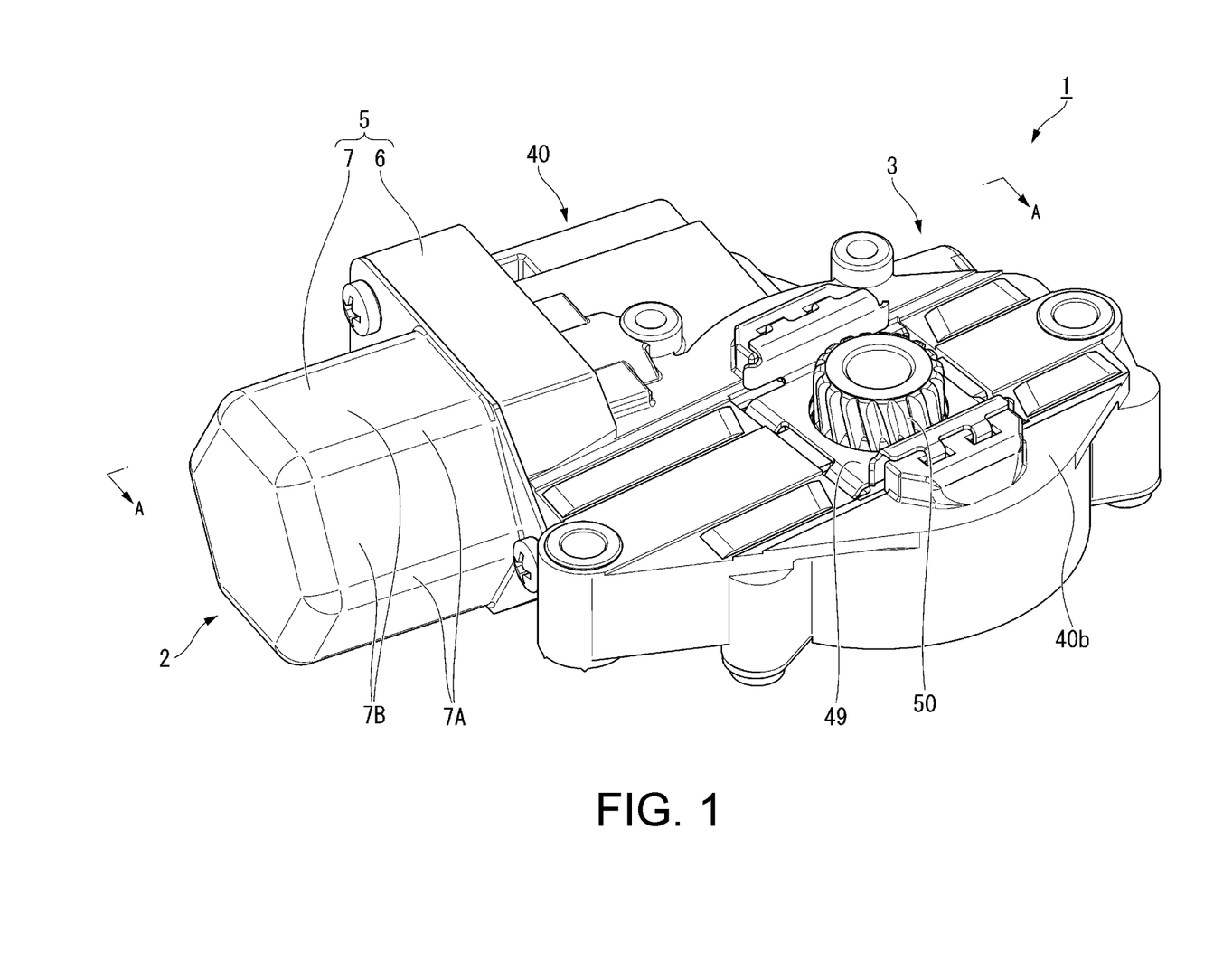
FIG. 1 is a perspective view of a brushless motor according to an embodiment of the disclosure.
Figure 2:
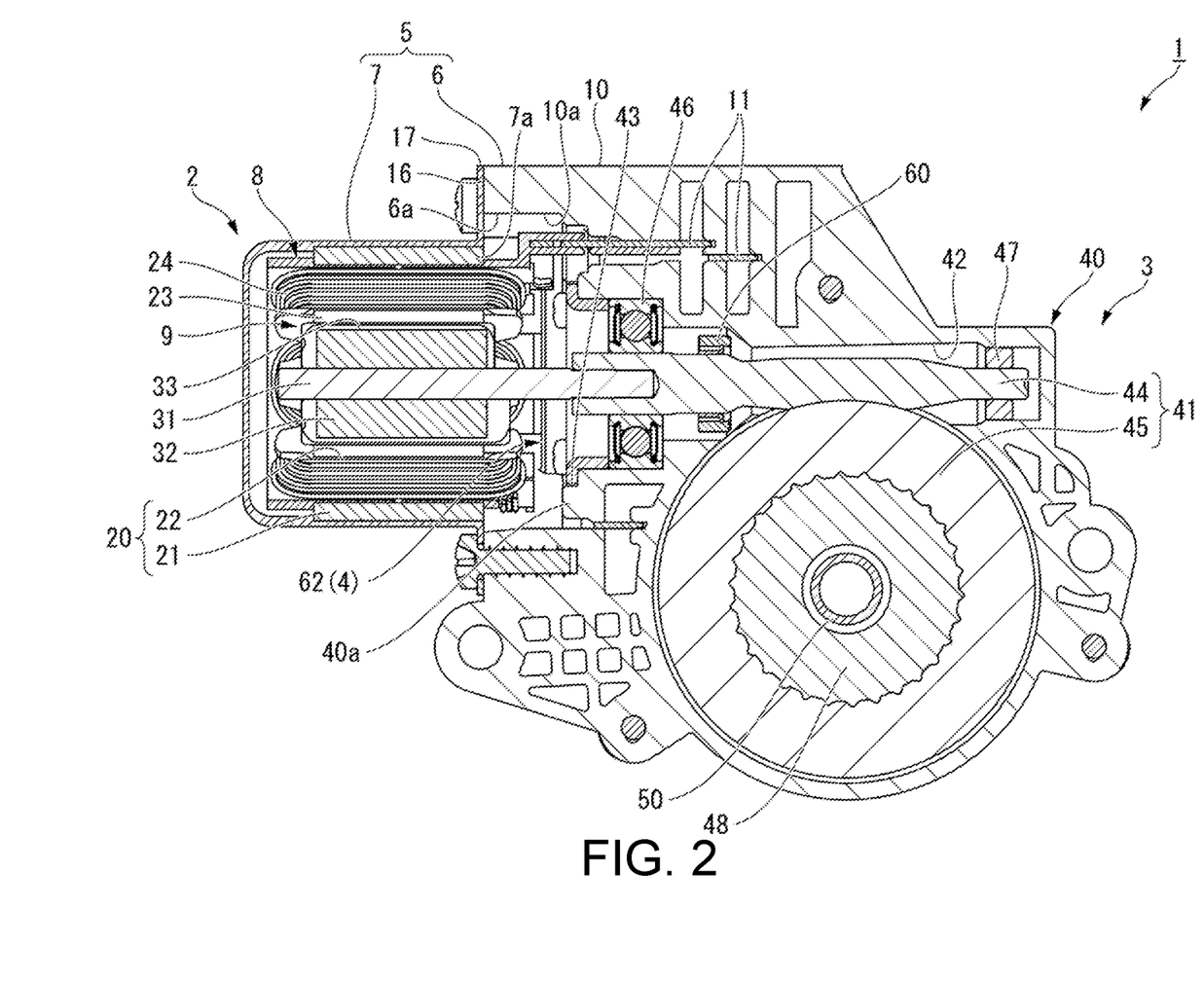
FIG. 2 is a cross-sectional view taken along the line A-A of FIG. 1.

FIG. 1 is a perspective view of a brushless motor 1. FIG. 2 is a cross-sectional view taken along the line A-A of FIG. 1.

The brushless motor 1 is, for example, a drive source for a sunroof mounted on a vehicle.

As shown in FIGS. 1 and 2, the brushless motor 1 includes a motor part (motor) 2, a deceleration part 3 that decelerates and outputs the rotation of the motor part 2, and a controller part 4 that controls the drive of the motor part 2.

<Motor Part>

The motor part 2 includes a motor case 5, a stator 8 housed in the motor case 5, and a rotor 9 provided inside the stator 8 in the radial direction and provided rotatably with respect to the stator 8. The motor part 2 is a so-called brushless motor that does not require a brush to supply electric power to the stator 8.

In the following description, the rotation axis C1 direction of the rotor 9 is simply referred to as the axial direction, the rotation direction of the rotor 9 is referred to as the circumferential direction, and the radial direction orthogonal to the axial direction and the circumferential direction is simply referred to as the radial direction.

<Motor Case>

The motor case 5 is made of a material having good heat dissipation property such as aluminum die casting. The motor case 5 includes a first motor case 6 and a second motor case 7 which are configured to be separable in the axial direction. The outer shapes of the first motor case 6 and the second motor case 7 are each formed into a bottomed tube.

The outer shape of the first motor case 6 is formed, for example, in a bottomed polygonal tubular shape with the second motor case 7 side open. The first motor case 6 is integrally molded with a gear case 40 so that the end part 10 on the deceleration part 3 side is joined to the gear case 40 of the deceleration portion 3. A through hole 10*a* through which a shaft 31 of the rotor 9 may be inserted is formed at substantially the center of the end part 10 in the radial direction. Further, an edge part 16 for joining the second motor case 7 is formed in an opening 6*a* on the second motor case 7 side in the first motor case 6.

The outer shape of the second motor case 7 is formed, for example, into a regular hexagon with rounded corners when viewed from the axial direction. That is, the peripheral wall of the second motor case 7 has six corner parts 7A and flat parts 7B, respectively. The second motor case 7 is formed in a bottomed tubular shape with the first motor case 6 side open. An outer flange part 17 protruding outward in the radial direction is formed in the opening 7*a* on the first motor case 6 side in the second motor case 7.

The motor case 5 has an internal space by abutting the edge part 16 of the first motor case 6 and the outer flange part 17 of the second motor case 7. The stator 8 is disposed in the internal space of the motor case 5 so that a part of a coil 24 (to be described later) is housed inside the first motor case 6, and a stator core 20 (to be described later) is fitted inside the second motor case 7.

<Stator>

Figure 3:
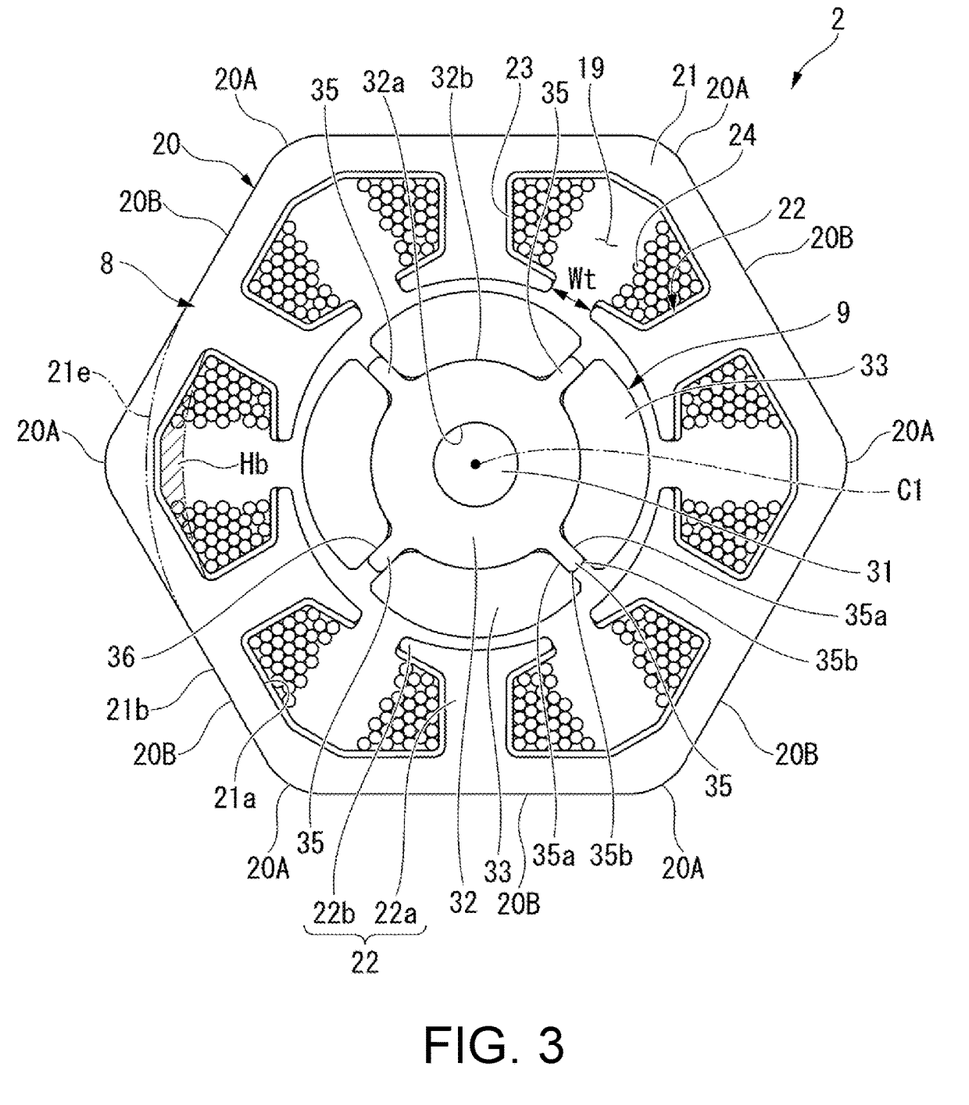
FIG. 3 is a plan view of the stator and the rotor according to an embodiment of the disclosure as viewed from the axial direction.

FIG. 3 is a plan view of the stator 8 and the rotor 9 as viewed from the axial direction.

As shown in FIGS. 2 and 3, the stator 8 has a stator core 20 in which a tubular core part 21 and multiple (for example, six in this embodiment) teeth 22 protruding radially inward from an inner peripheral surface 21*a* of the core part 21 are integrally formed.

The stator core 20 is formed by stacking multiple metal plates in the axial direction. The stator core 20 is not limited to the case of being formed by multiple metal plates stacked in the axial direction, and may be formed, for example, by pressure molding soft magnetic powder.

The core part 21 is formed in a tubular shape of regular hexagon with rounded corners when viewed from the axial direction to be fitted inside the second motor case 7. That is, the core part 21 has six corner parts 20A and flat parts 20B, respectively. The flat part 20B is formed to have a uniform wall thickness so that the inner peripheral surface 21*a* and the outer peripheral surface 21*b* are parallel to each other. The flat part 20B corresponds to one side in the claims.

The multiple teeth 22 protrude from the center of each flat part 20B of the core part 21 in the circumferential direction toward the inside in the radial direction.

The tooth 22 includes an integrally molded tooth body 22*a* and a pair of collars 22*b*. The tooth body 22*a* protrudes radially inward along the radial direction from the inner peripheral surface of the core part 21. The collar 22*b* extends along the circumferential direction from the radial inner end of the tooth body 22*a*. The collar 22*b* is formed to extend outward in the circumferential direction from the tooth body 22*a*. Then, a slot 19 is formed between the teeth 22 adjacent to each other in the circumferential direction. In the following description, the space between the collars 22*b* adjacent to each other in the circumferential direction in the slot 19 is referred to as a tooth opening 19*a*, and the width of the tooth opening 19*a* in the circumferential direction, that is, the width between the adjacent collars 22*b* in the circumferential direction is referred to as a tooth opening width Wt.

The inner peripheral surface of the core part 21 and the teeth 22 are covered with a resin insulator 23. The coil 24 is mounted to be wound around each tooth 22 from the surface of the insulator 23. Each coil 24 generates a magnetic field for rotating the rotor 9 by supplying power from the controller part 4.

<Rotor>

The rotor 9 is rotatably provided inside the stator 8 in the radial direction via a minute gap. The rotor 9 includes a shaft 31, a rotor core 32, and four permanent magnets 33. As described above, in the motor part 2, for example, the ratio of the number of magnetic poles of the permanent magnets 33 to the number of slots 19 (teeth 22) is 4:6.

The axis of the shaft 31 coincides with the rotation axis C1 of the rotor 9. The shaft 31 rotates around the rotation axis C1. The shaft 31 is integrally molded with a worm shaft 44 (see FIG. 2) that configures the deceleration part 3.

The rotor core 32 is fixed to be fitted to the outside of the shaft 31. The outer shape of the rotor core 32 is formed in a columnar shape with the shaft 31 as the rotation axis C1.

The rotor core 32 is formed by stacking multiple metal plates in the axial direction. The rotor core 32 is not limited to the case of being formed by multiple metal plates stacked in the axial direction, and may be formed, for example, by pressure molding soft magnetic powder.

Further, a through hole 32a penetrating in the axial direction is formed at the center of the rotor core 32 in the radial direction. The shaft 31 is press-fitted into the through hole 32a. The shaft 31 may be relatively inserted into the through hole 32a so that the rotor core 32 is fitted to the outside of the shaft 31, and the shaft 31 and the rotor core 32 may be fixed by an adhesive or the like.

In the rotor core 32, the arc center of the inner peripheral surface (that is, the inner peripheral surface of the through hole 32a) on the inner side in the radial direction and the arc center on the outer peripheral surface 32b on the outer side in the radial direction coincide with the position of the rotation axis C1 of the shaft 31.

Further, four protrusions 35 are provided on the outer peripheral surface 32b of the rotor core 32 at equal intervals in the circumferential direction. The protrusion 35 is formed to protrude outward in the radial direction and extend over the entire axial direction of the rotor core 32.

Further, the protrusion 35 is formed so that two side surfaces 35a facing each other in the circumferential direction are parallel to the protruding direction. That is, the protrusion 35 is formed so that the width dimension in the circumferential direction is uniform in the protruding direction.

Further, round chamfered parts 35b are formed at the corners on both sides in the circumferential direction on the outer side of the protrusion 35 in the protruding direction.

On the outer peripheral surface 32b of the rotor core 32 formed in this way, the space between the two protrusions 35 adjacent to each other in the circumferential direction is configured as a magnet accommodating part 36, respectively.

That is, the rotor 9 is a surface permanent magnet (SPM) type rotor having field permanent magnets 33 on the outer peripheral surface 32b of the rotor core 32, and is an inset-type rotor having protrusions 35 protruding radially outward from the rotor core 32 between the permanent magnets 33 arranged in the circumferential direction.

The four permanent magnets 33 are disposed in the four magnet accommodating parts 36 provided on the outer peripheral surface 32b of the rotor core 32. Each permanent magnet 33 is fixed to the rotor core 32 in the magnet accommodating part 36, for example, with an adhesive or the like.

The permanent magnet 33 is, for example, a ferrite magnet, a neodymium bond magnet, a neodymium sintered magnet, or the like.

The permanent magnet 33 is magnetized so that the orientation of the magnetism (magnetic field) is parallel in the thickness direction. That is, the orientation of the permanent magnet 33 is a parallel orientation in which the easy magnetization direction is parallel to the radial direction in the central part of the permanent magnet 33.

The permanent magnets 33 adjacent to each other in the circumferential direction are disposed so that their magnetization directions are opposite to each other. The four permanent magnets 33 are disposed so that the magnetic poles are alternated in the circumferential direction. That is, the permanent magnet 33 having the N pole on the outer peripheral side and the permanent magnet 33 having the S pole on the outer peripheral side are disposed to be adjacent to each other in the circumferential direction. As a result, the protrusion 35 of the rotor core 32 disposed between the permanent magnets 33 adjacent to each other in the circumferential direction is located at the boundary (pole boundary) of the magnetic poles.

<Deceleration Part>

With reference back to FIGS. 1 and 2, the deceleration part 3 includes a gear case 40 to which the motor case 5 is attached, and a worm deceleration mechanism 41 housed in the gear case 40.

The gear case 40 is made of a material having good heat dissipation property such as aluminum die casting. The outer shape of the gear case 40 is formed in a box shape, for example. The gear case 40 has a gear accommodating part 42 for accommodating the worm deceleration mechanism 41 inside. Further, in an end part 40a on the motor part 2 side of the gear case 40, an opening 43 through which the through hole 10a of the first motor case 6 and the gear accommodating part 42 are passed through is formed in the part where the first motor case 6 is integrally molded.

Further, a guide plate 49 is provided on a side surface 40b orthogonal to the end part 40a of the gear case 40. The guide plate 49 is provided to rotatably support an output shaft 48 of the worm deceleration mechanism 41.

The worm deceleration mechanism 41 housed in the gear accommodating part 42 is configured by a worm shaft 44 and a worm wheel 45 meshed with the worm shaft 44.

The worm shaft 44 is disposed coaxially with the shaft 31 of the motor part 2 (on the rotation axis C1). Both ends of the worm shaft 44 are rotatably supported by bearings 46 and 47 provided in the gear case 40. The end of the worm shaft 44 on the motor part 2 side protrudes through the bearing 46 to the opening 43 of the gear case 40. The end of the protruding worm shaft 44 and the end of the shaft 31 of the motor part 2 are joined, and the worm shaft 44 and the shaft 31 are integrated. The worm shaft 44 and the shaft 31 may be integrally formed by forming a worm shaft part and a rotation shaft part from one base material.

The worm wheel 45 is provided with an output shaft 48 at the center of the worm wheel 45 in the radial direction. The output shaft 48 is disposed coaxially with the rotation axis direction of the worm wheel 45. The output shaft 48 is connected to a gear part 50 protruding to the outside of the gear case 40 via the guide plate 49 of the gear case 40. The gear part 50 is connected to an electrical component (not shown).

Further, the worm shaft 44 is provided with a rotation position detection part 60 for detecting the rotation position of the worm shaft 44. The rotation position detection part 60 is connected to the controller part 4.

<Controller Part>

The controller part 4 that controls the drive of the motor part 2 has a controller board 62 on which a magnetic detection element or the like is mounted. The controller board 62 is disposed in the through hole 10a of the first motor case 6.

The controller board 62 is a so-called epoxy board on which multiple conductive patterns (not shown) are formed. The end part of the coil 24 drawn from the stator core 20 of the motor part 2 is connected to the controller board 62, and a terminal 11 provided in the gear case 40 is electrically connected to the controller board 62. Further, in addition to the magnetic detection element, a power module (not shown) including a switching element such as a field effect transistor (FET) that controls the current supplied to the coil 24 is mounted on the controller board 62. Further, a capacitor (not shown) or the like that smooths the voltage applied to the controller board 62 is mounted on the controller board 62.

The terminal 11 is formed to be able to fit with a connector extending from an external power supply (not shown). Then, the controller board 62 is electrically connected to the terminal 11. As a result, the electric power of the external power supply is supplied to the controller board 62.

<Operation of Brushless Motor>

Next, the operation of the brushless motor 1 will be described.

In the brushless motor 1, the electric power supplied to the controller board 62 via the terminal 11 is selectively supplied to each coil 24 of the motor part 2 via a power module (not shown).

Then, the current flowing through each coil 24 forms a predetermined interlinkage magnetic flux on the stator 8 (teeth 22). This interlinkage magnetic flux generates a magnetic attractive force or a repulsive force (magnet torque) with the effective magnetic flux formed by the permanent magnets 33 of the rotor 9.

Further, the protrusions 35 of the rotor core 32 generate a reluctance torque that rotates the rotor core 32 so as to make the protruding direction in a direction in which the interlinkage magnetic flux from the stator 8 (teeth 22) easily flows, and to reduce the magnetic resistance (reluctance) of the magnetic path of the interlinkage magnetic flux.

These magnet torques and reluctance torques continuously rotate the rotor 9. The rotation of the rotor 9 is transmitted to the worm shaft 44 integrated with the shaft 31, and further transmitted to the worm wheel 45 meshed with the worm shaft 44. Then, the rotation of the worm wheel 45 is transmitted to the output shaft 48 connected to the worm wheel 45, and the output shaft 48 drives a desired electrical component.

Further, the detection signal of the rotation position of the worm wheel 45 detected by the magnetic detection element mounted on the controller board 62 and the rotation position detection part 60 is output to an external device (not shown). The external device (not shown) is a software function part that functions by executing a predetermined program by a processor such as a central processing unit (CPU). The software function part is an electronic control unit (ECU) including a processor such as a CPU, a read only memory (ROM) for storing a program, a random access memory (RAM) for temporarily storing data, and an electronic circuit such as a timer.

Further, at least a part of the external device (not shown) may be an integrated circuit such as a large scale integration (LSI). The external device (not shown) controls the switching timing of the switching element or the like of the power module (not shown) based on the rotation position detection signal of the worm wheel 45, and controls the drive of the motor part 2. The output of the drive signal of the power module and the drive control of the motor part 2 may be executed by the controller part 4 instead of the external device (not shown).

<Winding Device>

Next, a winding device 70 and a method of winding the coil 24 around the stator core 20 using the winding device 70 will be described with reference to FIGS. 4 to 7.

Figure 4:
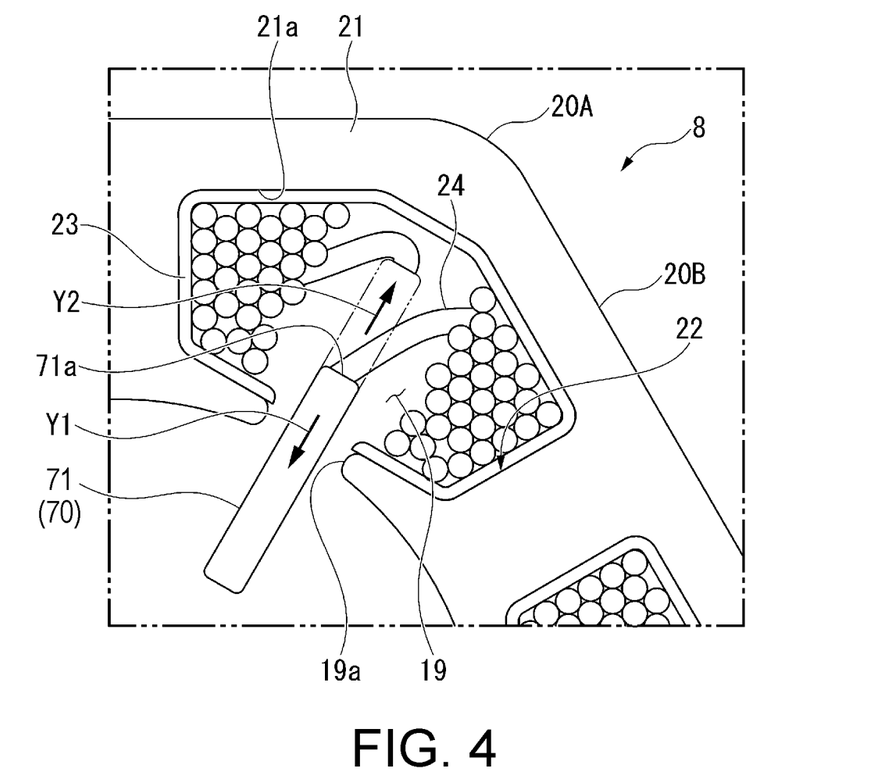
FIG. 4 is an illustration view showing a method of winding the coil around the stator core using the winding device according to an embodiment of the disclosure.

FIG. 4 is an illustration view showing a method of winding the coil 24 around the stator core 20 using the winding device 70.

As shown in FIG. 4, the winding device 70 has a nozzle 71 for feeding out the coil 24. The nozzle 71 is formed in a cylindrical shape. The tip 71a on the side where the coil 24 of the nozzle 71 is fed out is directed toward the slot 19, and the nozzle 71 is inserted into the slot 19 through the tooth opening 19a. Then, while the nozzle 71 moves around the tooth 22, the coil 24 is fed out from the nozzle 71, and the coil 24 is wound around the tooth 22.

Further, the nozzle 71 repeats reciprocating movement along the radial direction, and winds the coil 24 on the tooth 22 to be disposed along the radial direction. More specifically, when the coil 24 is wound while moving in the direction of pulling out the nozzle 71 from the slot 19 (see the arrow Y1 in FIG. 4), the coil 24 is sequentially wound on the outer peripheral surface of the tooth body 22a from the base on the core part 21 side toward the collar 22b. In addition, when the coil 24 is wound while moving in the direction of inserting the nozzle 71 toward the slot 19 (see the arrow Y2 in FIG. 4), the coil 24 is sequentially wound on the outer peripheral surface of the tooth body 22a from the collar 22b toward the base on the core part 21 side. By winding the coil 24 on the teeth 22 in this way, the coil 24 is stacked on the bundle, and the winding work of the coil 24 is completed.

Here, the core part 21 of the stator core 20 is formed in a tubular shape of regular hexagon with rounded corners when viewed from the axial direction, and has six corner parts 20A and flat parts 20B, respectively. The flat part 20B is formed to have a uniform wall thickness so that the inner peripheral surface 21a and the outer peripheral surface 21b are parallel to each other. Therefore, as shown in FIG. 3, the space in the slot 19 may be increased (see the hatch part Hb in FIG. 3) as compared with the case where the core part 21 is formed in a cylindrical shape (see reference numeral 21e of the two-dot chain line in FIG. 3). The space factor of the coil 24 may be reduced by this amount, and the nozzle 71 may be easily entered into the slot 19.

Next, the details of the nozzle 71 will be described with reference to FIG. 5.

Figure 5:
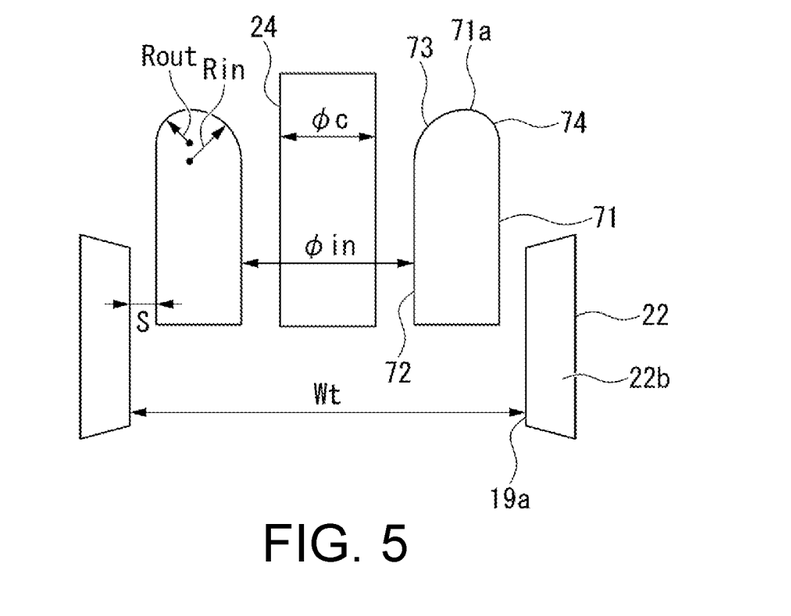
FIG. 5 is a schematic view of the nozzle according to an embodiment of the disclosure.

FIG. 5 is a schematic view of the nozzle 71.

As shown in FIG. 5, the nozzle 71 has a nozzle hole 72 from which the coil 24 is fed, an inner-diameter round chamfered part 73 formed at the opening edge of the nozzle hole 72 on a tip 71a side, and an outer-diameter round chamfered part 74 formed on the outer peripheral edge of the nozzle hole 72 on the tip 71a side. Each of the round chamfered parts 73 and 74 has an arc cross-sectional shape along the axial direction of the nozzle 71.

Here, when the wire diameter of the coil 24 is defined as $\Phi c$, the inner diameter of the nozzle hole 72 is defined as $\Phi in$, the radius of curvature of the inner-diameter round chamfered part 73 is defined as Rin, and the radius of curvature of the outer-diameter round diameter part 74 is defined as Rout, each of $\Phi c$, $\Phi in$, Rin, and Rout satisfy the following:

$$1.2\Phi c \leq \Phi in \leq 1.4\Phi c \tag{1}$$

$$0.51\Phi c \leq Rin \leq \Phi c \tag{2}$$

$$0.25\Phi c \leq Rout \leq 0.5\Phi c \tag{3}.$$

The wire diameter $\Phi c$ of the coil 24 is a value excluding the film thickness of the insulating coating of the coil 24.

This is because, regarding the equation (1), the inner diameter $\Phi in$ of the nozzle hole 72 needs to be sufficiently wider than the wire diameter $\Phi c$ of the coil 24.

The equation (2) will be described.

First, the bending strength of the coil 24 will be described with reference to FIG. 6.

Figure 6:
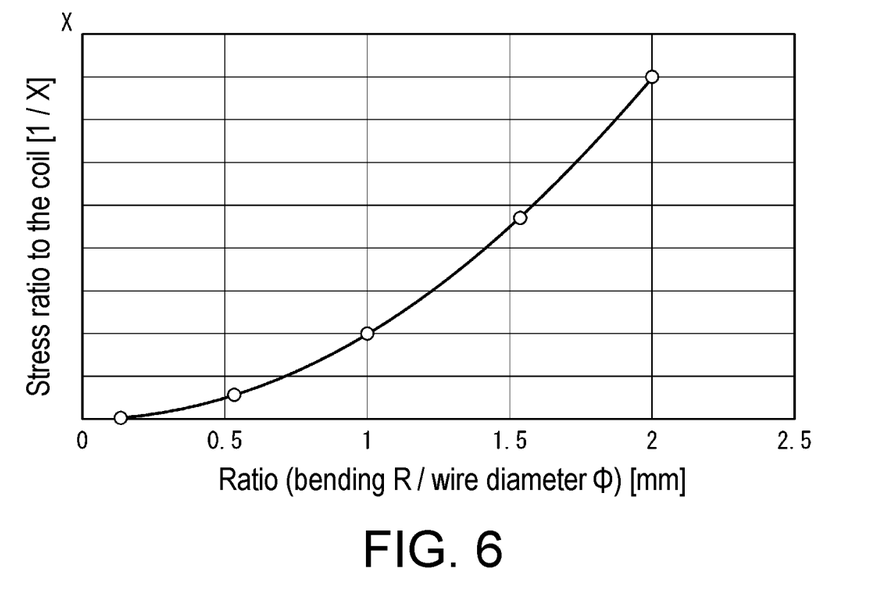
FIG. 6 is a graph showing changes in the stress ratio to the coil according to an embodiment of the disclosure.

FIG. 6 is a graph showing the change in the stress ratio to the coil 24 when the vertical axis is the stress ratio to the coil 24 [1/X] and the horizontal axis is the ratio of the bending curvature/wire diameter $\Phi c$ of the coil 24.

As shown in FIG. 6, it may be confirmed that the larger the bending curvature of the coil 24 with respect to the wire diameter Φc, the smaller the stress ratio to the coil 24. In addition, if the radius of curvature Rin of the inner-diameter round chamfered part 73 is made too large, the nozzle 71 becomes large and the tooth opening width Wt must be increased. Therefore, it is desirable that the ratio is in the vicinity of "1," and the radius of curvature Rin of the inner-diameter round chamfered part 73 satisfies the above equation (2).

The equation (3) will be described.

Here, the nozzle 71 repeats reciprocating movement along the radial direction, and the coils 24 are wound around the tooth 22 to be disposed along the radial direction. Therefore, as shown in FIG. 4, the coil 24 is always in slidable contact with the inner-diameter round chamfered part 73 of the nozzle 71, but the coil 24 is in slidable contact with the outer-diameter round chamfered part 74 of the nozzle 71 only when the nozzle 71 is moved toward the slot 19 in the inserting direction (see the arrow Y2 in FIG. 4). That is, the frequency with which the coil 24 is in slidable contact with the outer-diameter round chamfered part 74 is ½ as compared with the frequency with which the coil 24 is in slidable contact with the inner-diameter round chamfered part 73. Therefore, as shown in the equation (3), the radius of curvature Rout of the outer-diameter round chamfered part 74 is set to ½ of the radius of curvature Rin of the inner-diameter round chamfered part 73.

In addition, it is desirable that the tooth opening width Wt and the space S between the nozzle 71 and the teeth opening 19a satisfies the following:

$$0.1 \text{ mm} \leq S \leq 0.2 \text{ mm} \quad (4).$$

By doing so, it is possible to avoid contact between the teeth 22 and the nozzle 71.

Figure 7:
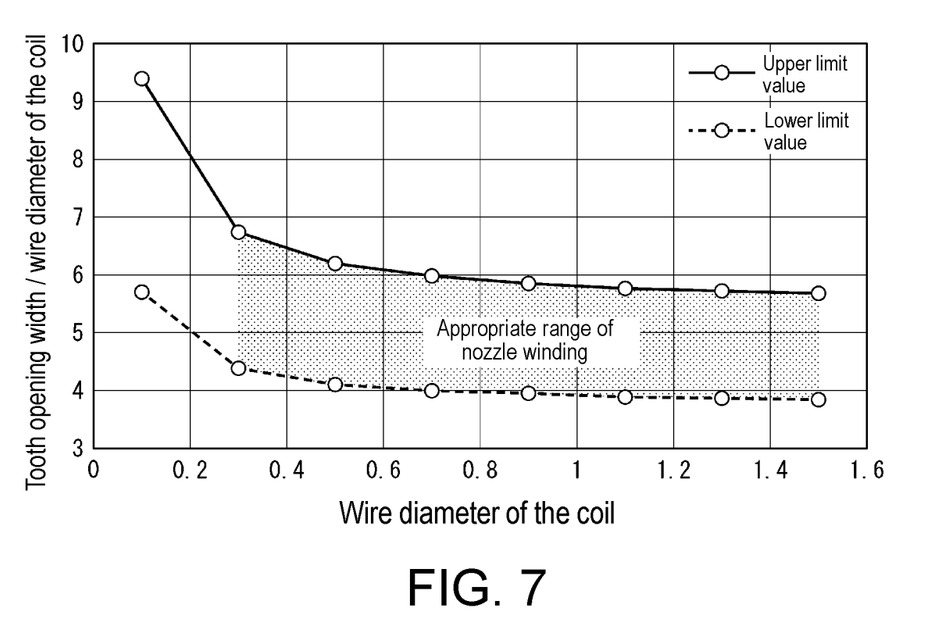
FIG. 7 is a graph showing changes in the tooth opening width and the coil wire diameter according to an embodiment of the disclosure.

FIG. 7 is a graph showing the change in the tooth opening width Wt/the wire diameter Φc of the coil 24 when the vertical axis is the tooth opening width Wt/the wire diameter Φc of the coil 24 and the horizontal axis is the wire diameter Φc of the coil 24.

As shown in FIG. 7, it is confirmed that it is desirable to set the wire diameter Φc of the coil 24 to satisfy $$0.3 \text{ mm} \leq \Phi c \leq 1.5 \text{ mm} \quad (5)$$

in the range from the lower limit value to the upper limit value of the above equations (1) to (4). When the wire diameter Φc of the coil 24 becomes smaller than 0.3 mm, the value of the tooth opening width Wt/the wire diameter Φc of the coil 24 increases sharply. Further, when the wire diameter Φc of the coil 24 becomes larger than 1.5 mm, it becomes difficult to actually bend the coil 24. Therefore, the above equation (5) is used.

Further, from the graph shown in FIG. 7, it is desirable that the tooth opening width Wt/the wire diameter Φc of the coil 24 satisfies the following:

$$3.83 \leq Wt/\Phi c \leq 6.73 \quad (6).$$

By satisfying the above equation (6), the tooth opening width Wt may be sufficiently secured, so that the coil 24 may be prevented from being scratched or damaged.

As described above, the nozzle 71 in the winding device 70 is formed to satisfy the above equations (1) to (3). Therefore, the bending stress of the coil 24 fed out from the nozzle 71 may be reduced as much as possible, so that damage during the winding work of the coil 24 may be prevented. Further, since it is possible to prevent the nozzle 71 from being unnecessarily enlarged, it is possible to prevent the motor part 2 from being enlarged and the motor characteristics from being deteriorated.

Further, the motor part 2 includes the rotor core 32 having the protrusions 35. Therefore, when rotating the rotor 9, both the reluctance torque and the magnetic force (magnet torque) of the permanent magnets 33 may be used, and the torque of the motor part 2 may be effectively increased. Since the space factor of the coil 24 may be reduced by this amount, the working hours for winding the coil 24 may be reduced, and damage to the coil 24 may be suppressed.

Further, the core part 21 of the stator core 20 is formed in a tubular shape of regular hexagon with rounded corners when viewed from the axial direction, and has six corner parts 20A and flat parts 20B, respectively. The flat part 20B is formed to have a uniform wall thickness so that the inner peripheral surface 21a and the outer peripheral surface 21b are parallel to each other. Therefore, as shown in FIG. 3, the space in the slot 19 may be increased (see the hatch part in FIG. 3) as compared with the case where the core part 21 is formed in a cylindrical shape (see the two-dot chain line in FIG. 3). The space factor of the coil 24 may be reduced by this amount, and the nozzle 71 may be easily entered into the slot 19. Therefore, the winding work of the coil 24 may be facilitated.

Further, it is desirable that the wire diameter Φc of the coil 24 satisfies the above equation (4). With this configuration, the shape (dimensions) of the nozzle 71 and the tooth opening width Wt may be made appropriate, and the enlargement of the motor part 2 and the deterioration of the motor characteristics may be reliably prevented.

Further, it is desirable that the tooth opening width Wt/the wire diameter Φc of the coil 24 satisfies the above equation (6). With this configuration, the tooth opening width Wt may be sufficiently secured, so that the coil 24 may be prevented from being scratched or damaged.

The disclosure is not limited to the above-described embodiment, and includes various modifications to the above-described embodiment without departing from the spirit of the disclosure.

For example, in the above-described embodiment, the brushless motor 1 is assumed to be a drive source for a sunroof mounted on a vehicle. However, the disclosure is not limited to this, and for example, the brushless motor 1 may be a drive source for various electrical components mounted on a vehicle (for example, a power window, an electric seat, a wiper, and the like) or a drive source mounted on various devices other than the vehicle.

In the above-described embodiment, the case where the ratio of the number of magnetic poles of the permanent magnets 33 to the number of slots 19 (teeth 22) in the motor part 2 is 4:6 has been described. However, the ratio is not limited to this, and the ratio between the number of magnetic poles of the permanent magnets 33 and the number of slots 19 (teeth 22) may be set as desired.

What is claimed is:

1. A motor in which a coil is wound by a winding device, comprising:
   a stator having a core part in a tubular shape, and a tooth that protrudes inward in a radial direction from an inner peripheral surface of the core part and around which the coil is wound; and
   a rotor provided inside the stator in the radial direction and rotating around a rotation axis,
   wherein the rotor comprises:
      a shaft that rotates around the rotation axis;
      a rotor core that is supported by the shaft and rotates with the rotation axis as a radial center;

a magnet disposed on an outer peripheral surface of the rotor core; and a protrusion that protrudes outward in the radial direction between the magnets adjacent to each other in a circumferential direction of the outer peripheral surface of the rotor core, wherein the tooth comprises:

a tooth body that protrudes inward in the radial direction from the inner peripheral surface of the core part; and a collar that extends along a circumferential direction from a radial inner end of the tooth body, wherein the core part is formed in a polygonal shape when viewed from a direction of the rotation axis, and a portion of the inner peripheral surface of the core part that faces a tooth opening between the collars adjacent to each other in the circumferential direction is formed flat so that a wall thickness at a polygonal vertex portion of the core part is greater than a wall thickness of polygonal side portions of the core part.

2. The motor according to claim 1, wherein a portion of the inner peripheral surface of the core part from which the tooth protrudes inward in the radial direction is formed flat so that the wall thickness of the polygonal side portions of the core part is uniform.

3. The motor according to claim 2, wherein when a wire diameter of the coil is defined as $\Phi c$, the wire diameter $\Phi c$ satisfies $0.3 \text{ mm} \leq \Phi c \leq 1.5 \text{ mm}$.

4. The motor according to claim 3, wherein the tooth comprises:

a tooth body that protrudes inward in the radial direction from the inner peripheral surface of the core part; and a collar that extends along a circumferential direction from a radial inner end of the tooth body, wherein when a width in the circumferential direction at a tooth opening between the collars adjacent to each other in the circumferential direction is defined as Wt and a wire diameter of the coil is defined as $\Phi c$, the width Wt and the wire diameter $\Phi c$ satisfy:

$$3.83 \leq Wt/\Phi c \leq 6.73.$$

5. The motor according to claim 2, wherein the tooth comprises:

a tooth body that protrudes inward in the radial direction from the inner peripheral surface of the core part; and a collar that extends along a circumferential direction from a radial inner end of the tooth body, wherein when a width in the circumferential direction at a tooth opening between the collars adjacent to each other in the circumferential direction is defined as Wt and a wire diameter of the coil is defined as $\Phi c$, the width Wt and the wire diameter $\Phi c$ satisfy:

$$3.83 \leq Wt/\Phi c \leq 6.73.$$

6. The motor according to claim 1, wherein when a wire diameter of the coil is defined as $\Phi c$, the wire diameter $\Phi c$ satisfies $0.3 \text{ mm} \leq \Phi c \leq 1.5 \text{ mm}$.

7. The motor according to claim 6, wherein the tooth comprises:

a tooth body that protrudes inward in the radial direction from the inner peripheral surface of the core part; and a collar that extends along a circumferential direction from a radial inner end of the tooth body, wherein when a width in the circumferential direction at a tooth opening between the collars adjacent to each other in the circumferential direction is defined as Wt and a wire diameter of the coil is defined as $\Phi c$, the width Wt and the wire diameter $\Phi c$ satisfy:

$$3.83 \leq Wt/\Phi c \leq 6.73.$$

8. The motor according to claim 1, wherein when a width in the circumferential direction at the tooth opening between the collars adjacent to each other in the circumferential direction is defined as Wt and a wire diameter of the coil is defined as $\Phi c$, the width Wt and the wire diameter $\Phi c$ satisfy:

$$3.83 \leq Wt/\Phi c \leq 6.73.$$

* * * * *